United States Patent
Singh et al.

(10) Patent No.: US 10,568,112 B1
(45) Date of Patent: Feb. 18, 2020

(54) PACKET PROCESSING IN A SOFTWARE DEFINED DATACENTER BASED ON PRIORITIES OF VIRTUAL END POINTS

(71) Applicant: Juniper Networks, Inc., Sunnyvale, CA (US)

(72) Inventors: Avinash Kumar Singh, Bangalore (IN); Chandra Mouli, Banagalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 70 days.

(21) Appl. No.: 15/700,983

(22) Filed: Sep. 11, 2017

(51) Int. Cl.
*H04W 72/12* (2009.01)
*G06F 9/455* (2018.01)
*G06F 9/48* (2006.01)

(52) U.S. Cl.
CPC .... *H04W 72/1205* (2013.01); *G06F 9/45533* (2013.01); *G06F 9/4881* (2013.01); *G06F 2009/45583* (2013.01); *G06F 2009/45595* (2013.01)

(58) Field of Classification Search
CPC ............ H04W 72/1205; G06F 9/45533; G06F 9/4881; G06F 2009/45595
See application file for complete search history.

(56) References Cited

U.S. PATENT DOCUMENTS

| | | | | |
|---|---|---|---|---|
| 7,590,054 B1* | 9/2009 | Holness | ............... | H04L 12/4633 370/225 |
| 2010/0324730 A1* | 12/2010 | Muller | ............... | H04L 12/40163 700/245 |
| 2013/0089089 A1* | 4/2013 | Kamath | ................. | H04L 12/413 370/358 |
| 2013/0165084 A1* | 6/2013 | Xu | .......................... | H04L 67/02 455/414.1 |
| 2013/0185445 A1* | 7/2013 | Larkin | ................. | H04L 65/1016 709/228 |
| 2015/0110124 A1* | 4/2015 | Armstrong | ........... | H04L 47/6215 370/412 |
| 2015/0333967 A1* | 11/2015 | Addanki | .................. | H04L 41/12 370/392 |
| 2016/0119289 A1* | 4/2016 | Jain | ...................... | H04L 63/0281 726/12 |
| 2018/0095776 A1* | 4/2018 | Tsai | ........................ | G06F 9/5083 |
| 2018/0352474 A1* | 12/2018 | Mehta | .................. | G06F 9/45558 |

* cited by examiner

*Primary Examiner* — Christopher M Crutchfield
*Assistant Examiner* — Tito Q Pham
(74) *Attorney, Agent, or Firm* — Harrity & Harrity, LLP

(57) ABSTRACT

A device may include one or more processors to receive priority information corresponding to a virtual machine of a computing environment, receive a packet associated with the virtual machine, determine a priority associated with the virtual machine based on the priority information, the priority information indicating the priority associated with the virtual machine relative to other virtual machines of the computing environment, and/or assign the packet to a queue associated with a service node of the computing environment based on the virtual machine, the packet to be output from the queue based on the priority associated with the virtual machine.

20 Claims, 8 Drawing Sheets

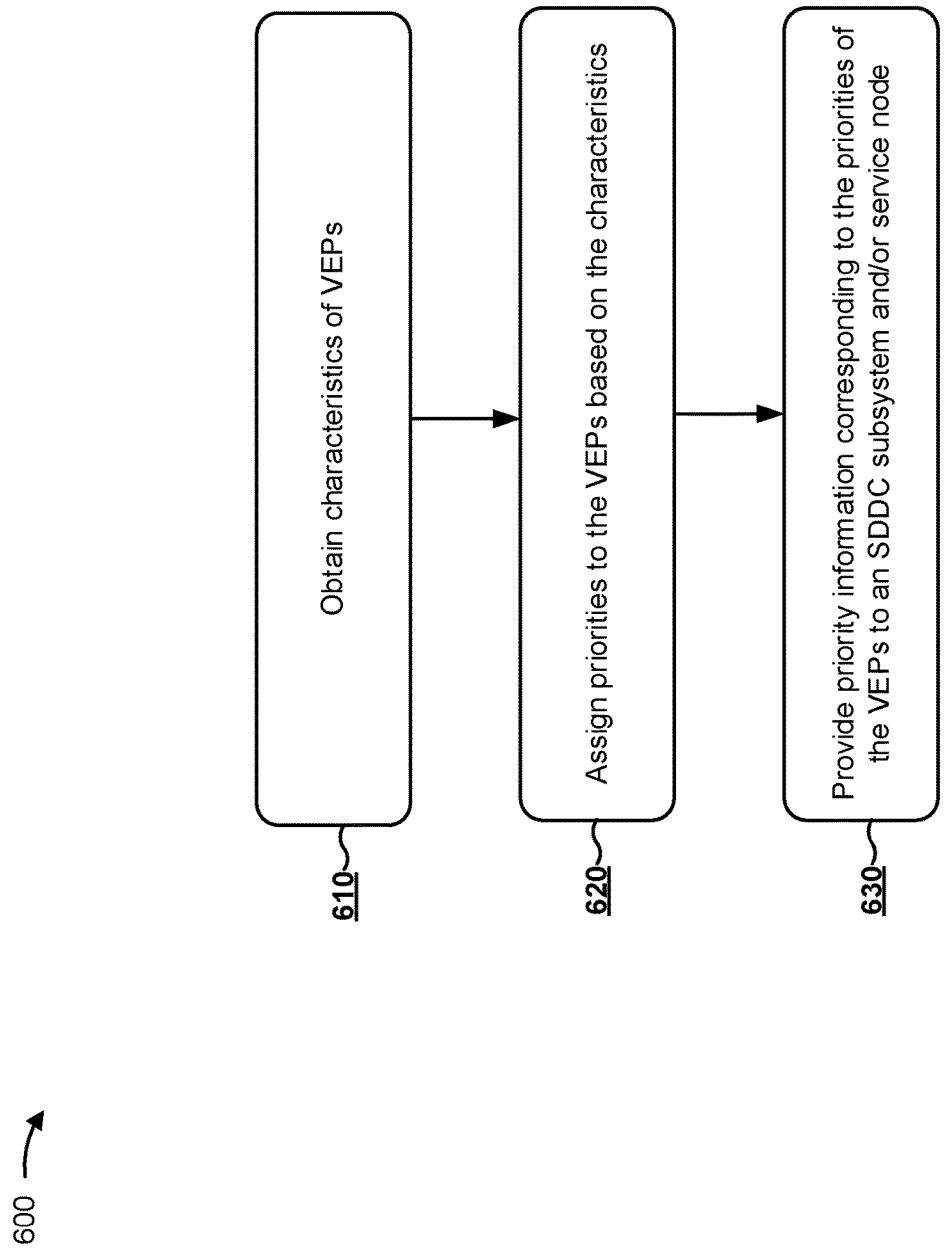

PACKET PROCESSING IN A SOFTWARE DEFINED DATACENTER BASED ON PRIORITIES OF VIRTUAL END POINTS

BACKGROUND

In computing, a virtual end point (VEP) may include a virtual machine (VM) (e.g., an emulation of a computer system), a virtual machine interface, a container, and/or the like. VEPs may be based on computer architectures, computer interfaces, and/or computer components and may provide functionality of physical computer architectures, physical computer interfaces, and/or physical computer components, respectively. VEPs may involve specialized hardware, software, or a combination of specialized hardware and software. Accordingly, VEPs may be hosted in a cloud environment or on a local device (such as a computer or server).

SUMMARY

According to some implementations, a device may include one or more processors to receive priority information corresponding to a virtual machine of a computing environment, receive a packet associated with the virtual machine, determine a priority associated with the virtual machine based on the priority information, the priority information indicating the priority associated with the virtual machine relative to other virtual machines of the computing environment, and/or assign the packet to a queue associated with a service node of the computing environment based on the virtual machine, the packet to be output from the queue based on the priority associated with the virtual machine.

According to some implementations, a non-transitory computer-readable medium may store instructions, the instructions comprising one or more instructions that, when executed by one or more processors, may cause the one or more processors to receive priority information corresponding to a virtual machine interface of a virtual machine of a computing environment; receive a packet associated with the virtual machine interface; determine a priority associated with the virtual machine interface based on the priority information, the priority information indicating the priority associated with the virtual machine interface relative to other virtual machine interfaces of the computing environment; and/or assign the packet to a queue to be processed by a service node of the computing environment based on the virtual machine interface, the packet to be output from the queue based on the priority associated with the virtual machine interface.

According to some implementations, a method may include receiving priority information corresponding to a virtual machine of a cloud computing environment; determining a priority associated with the virtual machine based on the priority information, the priority information indicating the priority associated with the virtual machine relative to other virtual machines of the cloud computing environment; receiving a packet from a queue associated with the virtual machine; and/or processing the packet from the queue based on the priority associated with the virtual machine.

BRIEF DESCRIPTION OF THE DRAWINGS

FIG. 6 is a flow chart of an example process for assigning priority to virtual end points.

DETAILED DESCRIPTION

Figure 1A:
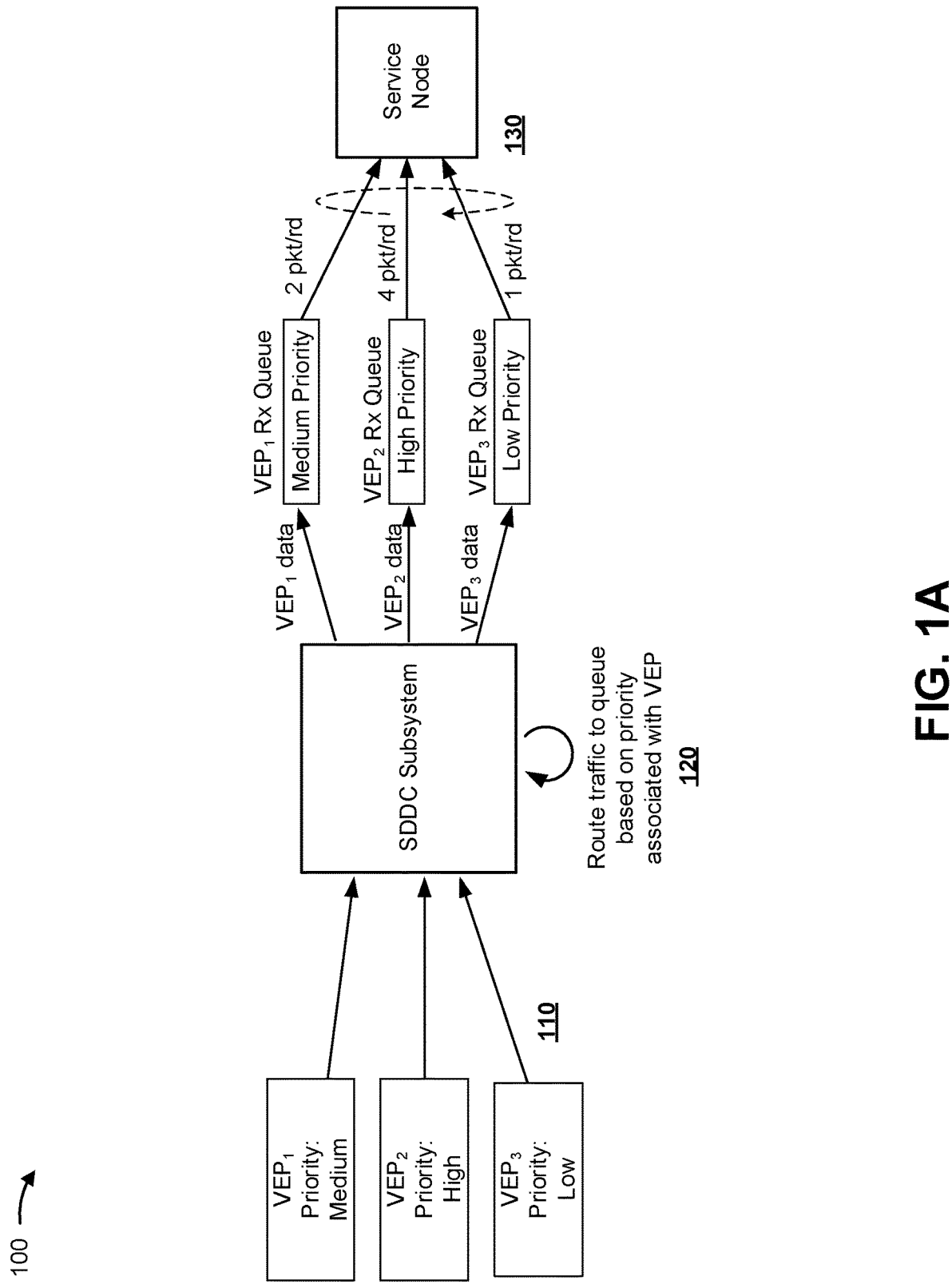
FIGS. 1A and 1B are diagrams of an overview of an example implementation described herein.

The following detailed description of example implementations refers to the accompanying drawings. The same reference numbers in different drawings may identify the same or similar elements.

In traditional networks that include physical switches and routers interconnected with physical links, queuing and scheduling processing stages are generally done on an egress interface to honor differentiated class-of-service treatment for traffic. In software-defined data centers (SDDCs), virtual nodes (e.g., virtual machines (VMs)) or containers replace physical nodes, and interconnect with each other through interfaces (e.g., VM interfaces). Accordingly, in SDDCs, traffic moving from one virtual node to another virtual node may go through many interfaces (e.g., sockets associated with buffers). In some instances, service nodes may analyze traffic traversing a network as the traffic moves from VM to VM. For example, micro-segmentation may be implemented within an SDDC as a security technique to enable security policies to be assigned to data center applications. When data moves from one VM to another VM, the service node may analyze and/or process a packet of the data, and allow or disallow the packet based on the content of the packet (e.g., allow the packet to pass if the packet does not include malware, prevent the packet from passing if the packet does include malware).

Some implementations, described herein, provide an SDDC subsystem (e.g., a network subsystem, a storage subsystem, and/or the like) and/or a service node to provide class-based treatment of traffic in an SDDC or cloud computing environment. Based on a priority of a particular virtual end point (VEP) (e.g., a particular VM, a particular VM interface associated with the particular VM, a particular container, and/or the like), the SDDC subsystem and/or the service node may process traffic associated with the VEP. For example, when a service node is to process traffic, the service node may receive traffic from particular queues at a rate based on a priority associated with the particular VEPs. Additionally, or alternatively, an SDDC subsystem may receive traffic processed by the service node from particular queues at a rate corresponding to the priority of a particular VEP associated with the traffic. In this way, the SDDC subsystem and/or the service node may provide class-based treatment to VEPs of an SDDC and/or cloud computing environment. Also, in this way the SDDC subsystem and/or the service node may provide fine-tuned service processing for particular groups or sets of VEPs relative to others. Accordingly, traffic may be prioritized to ensure continuous operation of a particular VEP, class-based traffic for VEPs to provide deterministic traffic behavior in the SDDC, and/or the like.

In some implementations, described herein, the SDDC subsystem and/or the service node may monitor priority of traffic to determine when VMs are to be transferred to other computing resources (e.g., servers). For example, if a threshold amount of high priority traffic is being received from a particular VEP of a computing resource, and the computing resource is nearing bandwidth limits, the SDDC subsystem and/or the service node may transfer a VM associated with the VEP to another computing resource. In this way, the SDDC subsystem and/or the service node may monitor, track, and distribute VMs and/or computing resources (e.g., to enable visibility to a user, to ensure efficient performance of the computing resources, to prevent overloading a network or computing resource, or the like). Furthermore, in some implementations, statistics corresponding to various traffic streams, workloads of operations of a VM, and/or the like may be analyzed or included to inform a user that VMs are to be moved or added (e.g., to enable automated load balancing).

Figure 1B:
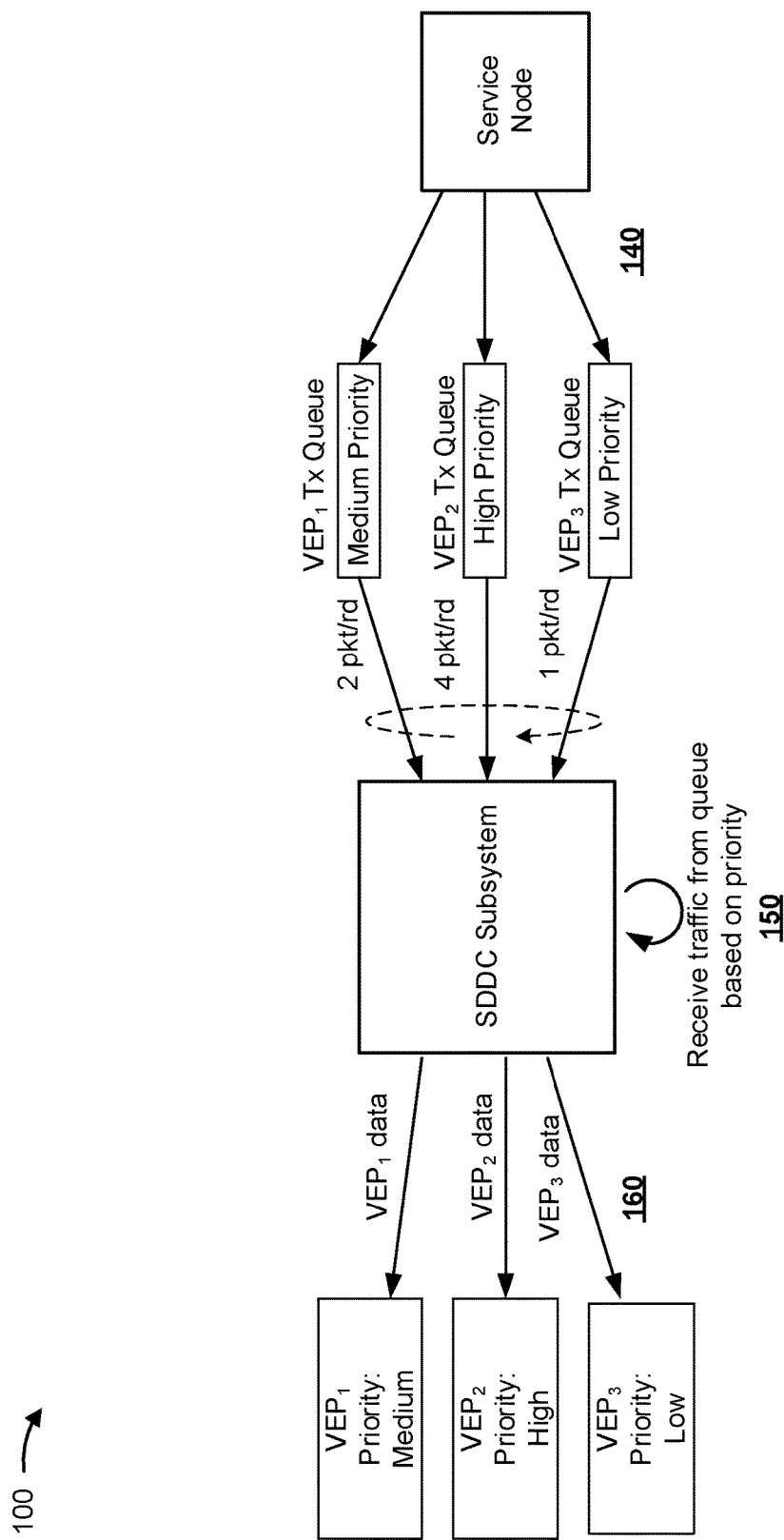

FIGS. 1A and 1B are diagrams of an overview of an example implementation 100 described herein. Example implementation 100 may include a $VEP_1$, which is assigned a medium priority (e.g., $VEP_1$ Priority: Medium), a $VEP_2$, which is assigned a high priority (e.g., $VEP_2$ Priority: High), and a $VEP_3$, which is assigned a low priority (e.g., $VEP_3$ Priority: Low). As shown, FIG. 1A is associated with a receive direction relative to a service node, and FIG. 1B is associated with a transmit direction relative to the service node.

In some implementations, the SDDC subsystem and/or the service node may receive priority information corresponding to a VEP of a network, may receive one or more packets associated with the VEP, may determine a priority associated with the VEP based on the priority information, and may indicate a priority associated with the VEP relative to other VEPs of the network. In some implementations, the SDDC subsystem may assign a packet to a VEP queue associated with the service node based on the priority of the packet. The service node (on the Rx side) may receive the packet from the VEP queue based on the priority associated with the VEP. For example, the service node may use a scheduling algorithm (e.g., weighted round robin (WRR), deficit round robin (DRR), fair share scheduling, and/or the like). Additionally, or alternatively, the service node (on the Tx side) may assign a packet to a VEP queue associated with the SDDC subsystem based on the priority of the packet. The SDDC subsystem may then receive the packet from the VEP queue based on the priority associated with the VEP.

As shown in FIG. 1A, and by reference number 110, in the receive direction, $VEP_1$, $VEP_2$, and $VEP_3$ may provide data to the SDDC subsystem (e.g., to be provided to other VEPs in communication with the SDDC subsystem). In some implementations, the priority indicated for $VEP_1$, $VEP_2$, and $VEP_3$ may be associated with $VEP_1$, $VEP_2$, and $VEP_3$. In some implementations, the priority for $VEP_1$, $VEP_2$, and $VEP_3$ may be based on class of service to be provided to $VEP_1$, $VEP_2$, and $VEP_3$ and/or data to/from VEP $VEP_1$, $VEP_2$, and $VEP_3$.

For example, and as shown by reference number 120, the SDDC subsystem may route $VEP_1$ medium priority data to the $VEP_1$ Rx medium priority queue, may route $VEP_2$ high priority data to $VEP_2$ Rx high priority queue, and may route $VEP_3$ low priority data to $VEP_3$ Rx low priority queue.

As shown by reference number 130, the service node may receive data from the individual queues based on the priority associated with the VEP. For example, and as shown, the service node may receive data from the $VEP_1$ Rx queue, the $VEP_2$ Rx queue, and the $VEP_3$ Rx queue. As shown, WRR schedule to receive the data from the $VEP_1$ Rx queue, the $VEP_2$ Rx queue, and the $VEP_3$ Rx queue in which data is received from the queues at rates corresponding to the priorities (e.g., a high rate for high priority, a medium rate for medium priority, and a low rate for low priority). For example, as shown in FIG. 1A, during each round of processing, the service node may receive one packet (low rate) of data from the low priority $VEP_3$ Rx queue, two packets (medium rate) of data from the medium priority $VEP_1$ Rx queue, and four packets (high rate) of data from the high priority $VEP_2$ Rx queue.

In this way, the service node may process traffic based on the priority of $VEP_1$, $VEP_2$, and $VEP_3$ to provide a class-based treatment to $VEP_1$, $VEP_2$, and $VEP_3$.

As shown in FIG. 1B, and by reference number 140, the service node, in the transmit direction, may route traffic to a queue based on a particular VEP associated with the traffic. For example, the service node may route data for $VEP_1$ to the $VEP_1$ Tx queue (having a medium priority corresponding to $VEP_1$), may route data for $VEP_2$ to $VEP_2$ Tx queue (having a high priority corresponding to $VEP_2$), and may route data for $VEP_3$ to $VEP_3$ Tx queue (having a low priority corresponding to $VEP_3$).

The SDDC subsystem may receive one or more packets from the queues based on the priorities associated with the VEPs, as shown by reference number 150. For example, the SDDC subsystem may receive $VEP_1$ medium priority data from the $VEP_1$ Rx medium priority queue, may receive $VEP_2$ high priority data from the $VEP_2$ Rx high priority queue, and may receive $VEP_3$ low priority data from the $VEP_3$ Rx low priority queue. In some implementations, similar to the service node in FIG. 1A, the SDDC subsystem may use a WRR scheduler to obtain the data from the Tx queues. For example, during one round of processing, the SDDC subsystem may obtain one packet of data from the low priority $VEP_3$ Rx queue, four packets of data from the high priority $VEP_2$ Rx queue, and two packets of data from the medium priority $VEP_1$ Rx queue.

As shown by reference number 160, the SDDC subsystem may route the traffic to appropriate VEPs based on the priority of the VEPs. For example, the SDDC subsystem may route medium priority traffic to $VEP_1$, may route high priority traffic to $VEP_2$, and may route low priority traffic to $VEP_3$.

In this way, the SDDC subsystem and/or the service node may provide class-based treatment to VEPs of an SDDC and/or cloud computing environment. Also, in this way the SDDC subsystem and/or the service node may provide fine-tuned service processing for particular groups or sets of VEPs.

As indicated above, FIGS. 1A and 1B are provided merely as an example. Other examples are possible and may differ from what was described with regard to FIGS. 1A-1B.

Figure 2A:
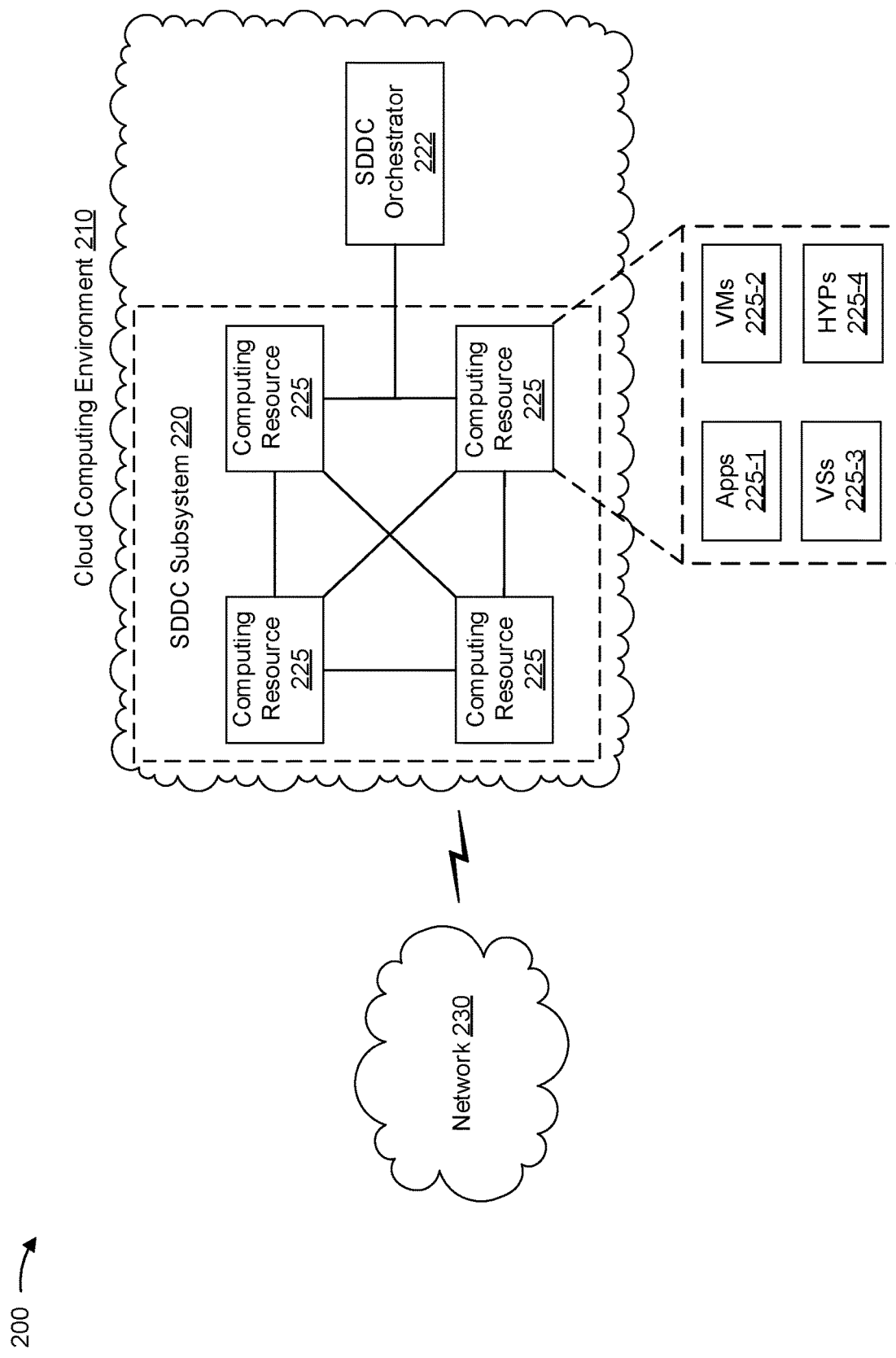
FIGS. 2A and 2B are diagrams of an example environment in which systems and/or methods, described herein, may be implemented.
Figure 2B:
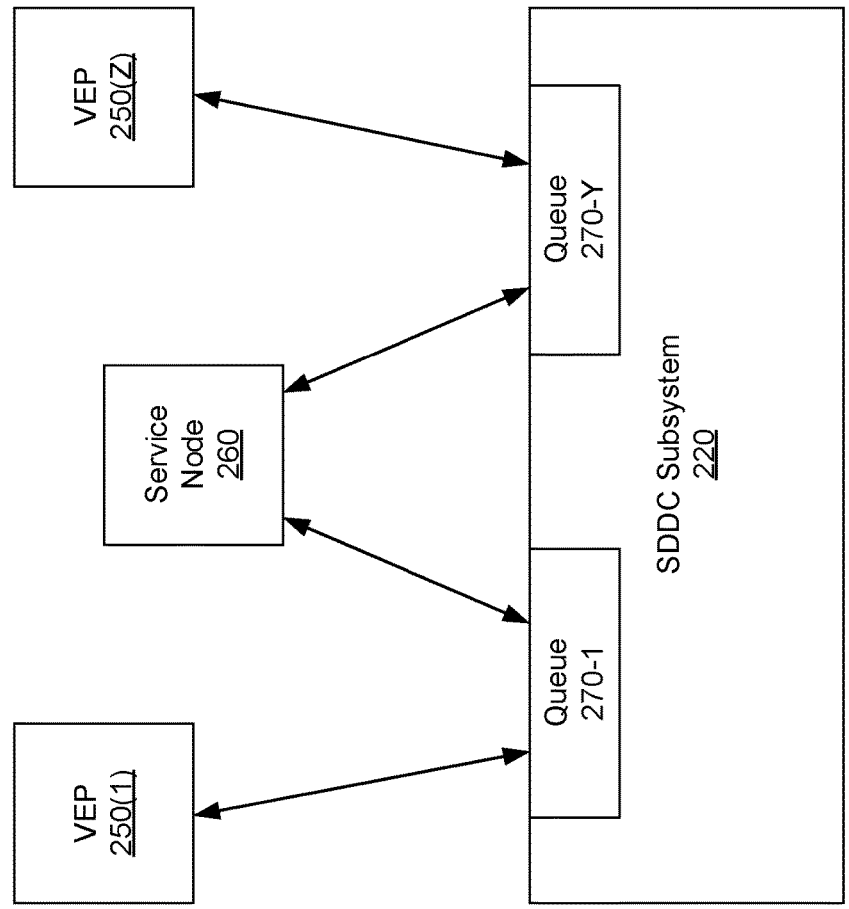

FIGS. 2A and 2B are diagrams of an example environment 200 in which systems and/or methods, described herein, may be implemented. As shown in FIG. 2A, environment 200 may include a cloud computing environment 210, hosting an SDDC subsystem 220 with computing resources 225, and a network 230. Devices and/or networks of environment 200 may interconnect via wired connections, wireless connections, or a combination of wired and wireless connections.

Cloud computing environment 210 includes an environment that delivers computing as a service, whereby shared resources, services, etc. may be provided to devices of network 230. Cloud computing environment 210 may provide computation, software, data access, storage, network, security, and/or other services that do not require end-user knowledge of a physical location and configuration of a system and/or a device that delivers the services. As shown, cloud computing environment 210 may include SDDC subsystem 220, SDDC orchestrator 222 and computing resource 225, including one or more applications ("APPs") 225-1, one or more virtual machines ("VMs") 225-2, one or more virtualized storages ("VSs") 225-3, and one or more hypervisors ("HYPs") 225-4. In some implementations, cloud computing environment 210 may be implemented by one or more SDDCs.

SDDC subsystem 220 may include a network subsystem that provides network services (e.g., routing services, security services, communication services, and/or the like), a storage subsystem that provides storage services (e.g., memory services, database services, indexing, virtual storage, and/or the like), graphics processing system, and/or any other type of SDDC system. In some implementations, SDDC subsystem may include or facilitate graphics processing services (e.g., similar to a graphics processing unit) for a system. SDDC subsystem 220 may include a server device or a group of server devices. In some implementations, SDDC subsystem 220 may be hosted in cloud computing environment 210. Notably, while some implementations described herein may describe SDDC subsystem 220 as being hosted in cloud computing environment 210, in some implementations, SDDC subsystem 220 may not be cloud-based or may be partially cloud-based.

SDDC subsystem 220 may be one or more devices capable of receiving, transmitting, and/or routing traffic to/from VEPs (e.g., VEPs 250, virtual interfaces of VEPs 250, VSs 225-3) and/or service nodes (e.g., Apps 225-1 and/or VEPs 250) of cloud computing environment 210. In some implementations, SDDC subsystem 220 identifies queues associated with VMs to route data to the appropriate queues associated with a service node. In some implementations, based on priority associated with a VEP and/or queue, SDDC subsystem 220 may process or forward data from the queue to an appropriate VEP. In some implementations, SDDC subsystem 220 may include, may be included within, or may be implemented by an SDDC. Additionally, or alternatively, SDDC subsystem 220 may include, may be included within, or may be implemented by an intrusion prevention system (IPS), an intrusion detection system (IDS), or the like. In some implementations, SDDC subsystem 220 may be running in kernels associated with one or more servers of cloud computing environment 210.

SDDC orchestrator 222 may be one or more devices capable of assigning priority to VEPs associated with SDDC subsystem 220. For example, SDDC orchestrator 222 may assign the priority based on a service level agreement (SLA) associated with the VEPs, based on traffic type of the VEPs, based on processing capabilities of the VEPs, and/or the like. In some implementations, SDDC orchestrator 222 may implement machine learning to assign priority to the VEPs. SDDC orchestrator 222 may include a server device or a group of server devices. In some implementations, SDDC orchestrator 222 may be hosted in cloud computing environment 210. Notably, while some implementations described herein may describe orchestrator 222 as being hosted in cloud computing environment 210, in some implementations, SDDC orchestrator 222 may not be cloud-based or may be partially cloud-based.

Computing resource 225 includes one or more personal computers, workstation computers, server devices, or other types of computation and/or communication devices. In some implementations, computing resource 225 may host SDDC subsystem 220. The cloud resources may include compute instances executing in computing resource 225, storage devices provided in computing resource 225, data transfer devices provided by computing resource 225, security devices provided by computing resource 225, or the like. In some implementations, computing resource 225 may communicate with other computing resources 225 via wired connections, wireless connections, or a combination of wired and wireless connections.

As described above, computing resource 225 may include a group of cloud resources, such as the applications ("APPs") 225-1, the virtual machines ("VMs") 225-2, the virtualized storages ("VSs") 225-3, the hypervisors ("HYPs") 225-4, or the like.

Application 225-1 includes one or more software applications that may be provided to or accessed by devices of network 230. Application 225-1 may eliminate a need to install and execute the software applications on devices of network 230. For example, application 225-1 may include software associated with SDDC subsystem 220 and/or any other software capable of being provided via cloud computing environment 210. In some implementations, one application 225-1 may send/receive information to/from one or more other applications 225-1, via VEP 250.

VEP 250 includes a software implementation of a machine (e.g., a computer) that executes programs like a physical machine. VEP 250 may be either a system virtual machine or a process virtual machine, depending upon use and degree of correspondence to any real machine by VEP 250. A system virtual machine may provide a complete system platform that supports execution of a complete operating system ("OS"). A process virtual machine may execute a single program, and may support a single process. In some implementations, VEP 250 may execute on behalf of a user (e.g., a user of a device of network 230, an operator of network 230, an organization associated with cloud computing environment 210, or the like), and may manage infrastructure of cloud computing environment 210 or SDDC subsystem 220, such as data management, synchronization, security, or data transfers. In some implementations, virtual machines 225-2 may be a tenant virtual machine.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

FIG. 2B shows an example environment of a computing resource 225. In some implementations, FIG. 2B may be an example environment for micro-segmentation.

As shown in FIG. 2B, computing resource 225 may include one or more VEPs 250(1) through 250(Z) (Z≥1) (hereinafter referred to collectively as "VEPs 250," and individually as "VEP 250"), a service node 260, and SDDC subsystem 220 (referred to herein as SDDC subsystem 220) which includes one more queues 270-1 through 270-Y (Y≥1) (hereinafter referred to collectively as "queues 270," and individually as "queue 270"). Computing resource 225 may be an example implementation of a computing resource utilized in micro-segmentation according to some implementations herein. Devices and/or networks of computing resource 225 may interconnect via wired connections, wireless connections, or a combination of wired and wireless connections. In some implementations, VEP 250(1) through VEP 250(Z) may correspond to VEPs 250 of FIG. 2A.

In some implementations, VEP 250(1) through VEP 250(Z) may implement medium priority $VEP_1$, high priority $VEP_2$, and/or low priority $VEP_3$ of the example implementation 100 of FIGS. 1A and 1B. In some implementations, queue 270-1 through queue 270-Y may implement medium priority $VEP_1$ Rx queue, high priority $VEP_2$ Rx queue, low priority $VEP_3$ Rx queue, medium priority $VEP_1$ Tx queue, high priority $VEP_2$ Tx queue, and/or low priority $VEP_3$ Tx queue of the example implementation 100 of FIGS. 1A and 1B.

In some implementations, SDDC subsystem 220 and/or service node 260 may receive priority information corresponding to a particular VEP 250 of cloud computing environment 210 (e.g., from SDDC orchestrator 222 that has access to service level agreements associated with the VEPs 250). SDDC subsystem 220 and/or service node 260 also may receive one or more packets associated with the particular VEP 250. SDDC subsystem 220 and/or service node 260 may determine a priority associated with the particular VEP 250 based on the priority information. The priority information may indicate a priority associated with the particular VEP 250 relative to other VEPs 250 of cloud computing environment 210.

In some implementations, service node 260 may provide a service by processing or analyzing packets. For example, service node 260 may provide a security service to implement a security policy to ensure that traffic passing from one VEP 250 to another VEP 250 does not include malware. In some implementations, service node 260 may block or allow traffic to pass (e.g., and act as a bump in the wire (BITW), a security appliance, or the like). In some implementations, service node 260 may perform packet inspection, packet counting, packet look-up (for forwarding, routing, or quality of service), or any other type of service.

In some implementations, queues 270 may be steering interfaces associated with VEPs 250. In some implementations, queues 270 may correspond to queues of interfaces of the VEPs 250. In this case, queues 270 may map to VEPs 250, such that when service node 260 and/or SDDC subsystem 220 obtains a packet for a particular queue 270, service node 260 may be aware that the packet either comes from a particular VEP 250 or goes to a particular VEP 250.

In some implementations, SDDC subsystem 220 may assign a packet to a particular queue 270 (e.g., an Rx queue) associated with service node 260 based on a priority of a VEP 250 associated with the packet (e.g., a source VEP of the packet or a destination VEP of the packet). Service node 260 may obtain the packet from the particular queue 270 based on the priority associated with the particular VEP 250. Additionally, or alternatively, service node 260 may assign a packet to a particular queue 270 (e.g., a Tx queue) based on the priority of the packet. SDDC subsystem 220 may obtain the packet from the particular queue 270 based on the priority associated with the particular VEP 250. In some implementations, SDDC subsystem 220 may correspond to at least a portion of SDDC subsystem 220 of FIG. 2A.

The number and arrangement of devices and networks shown in FIGS. 2A and 2B are provided as examples. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and/or 2B may be implemented within a single device, or a single device shown in FIGS. 2A and/or 2B may be implemented as multiple, distributed devices. Additionally, or alternatively, a set of devices (e.g., one or more devices) of environment 200 of FIGS. 2A and/or computing resource 225 of FIG. 2B may perform one or more functions described as being performed by another set of devices of environment 200 or computing resource 225, respectively.

Figure 3:
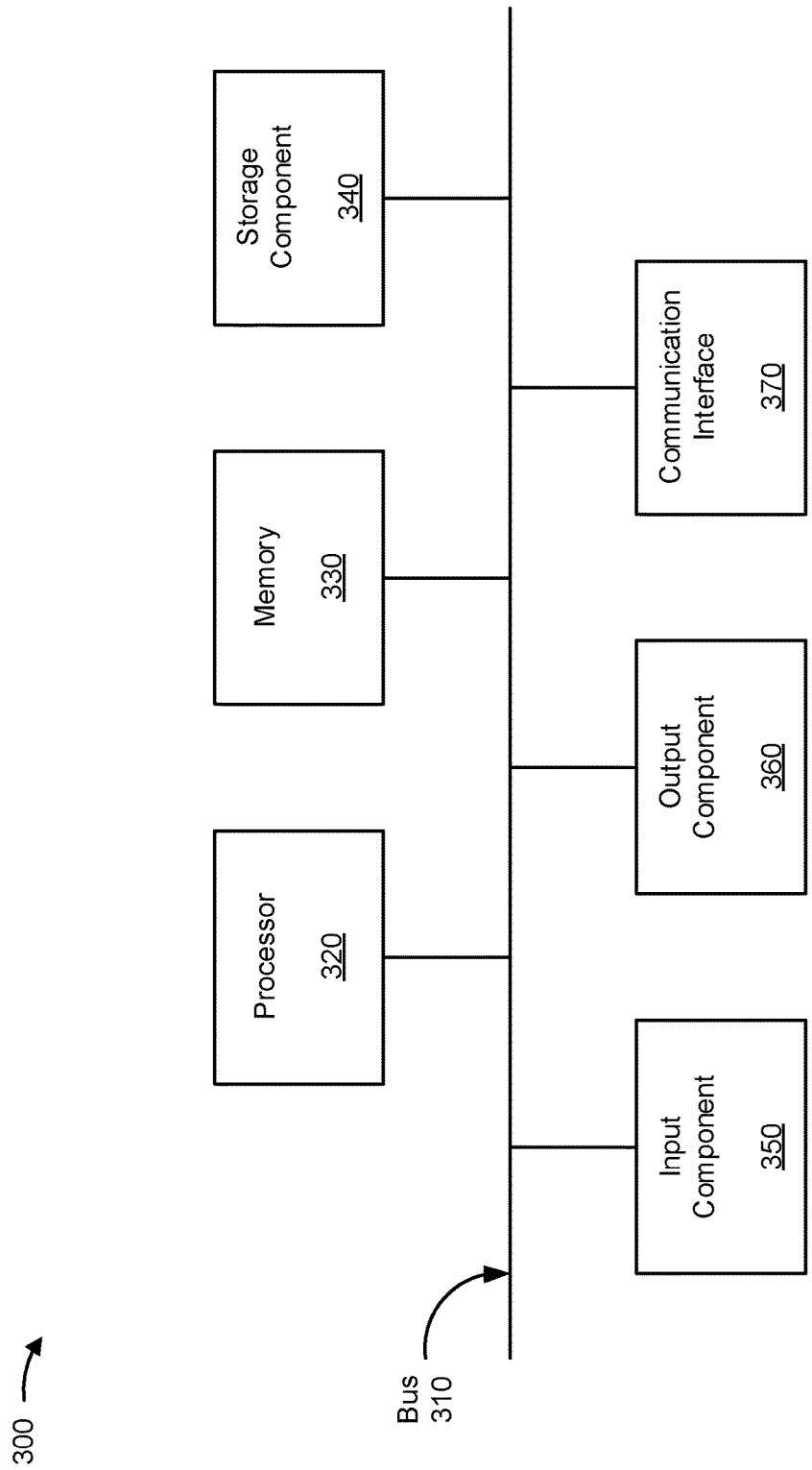
FIG. 3 is a diagram of example components of one or more devices of FIGS. 2A and 2B.

FIG. 3 is a diagram of example components of a device 300. Device 300 of FIG. 3 may correspond to a computing resource 225 of cloud computing environment 210 and/or SDDC subsystem 220 of FIGS. 2A and/or 2B. In some implementations, cloud computing environment 210, SDDC subsystem 220, and computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
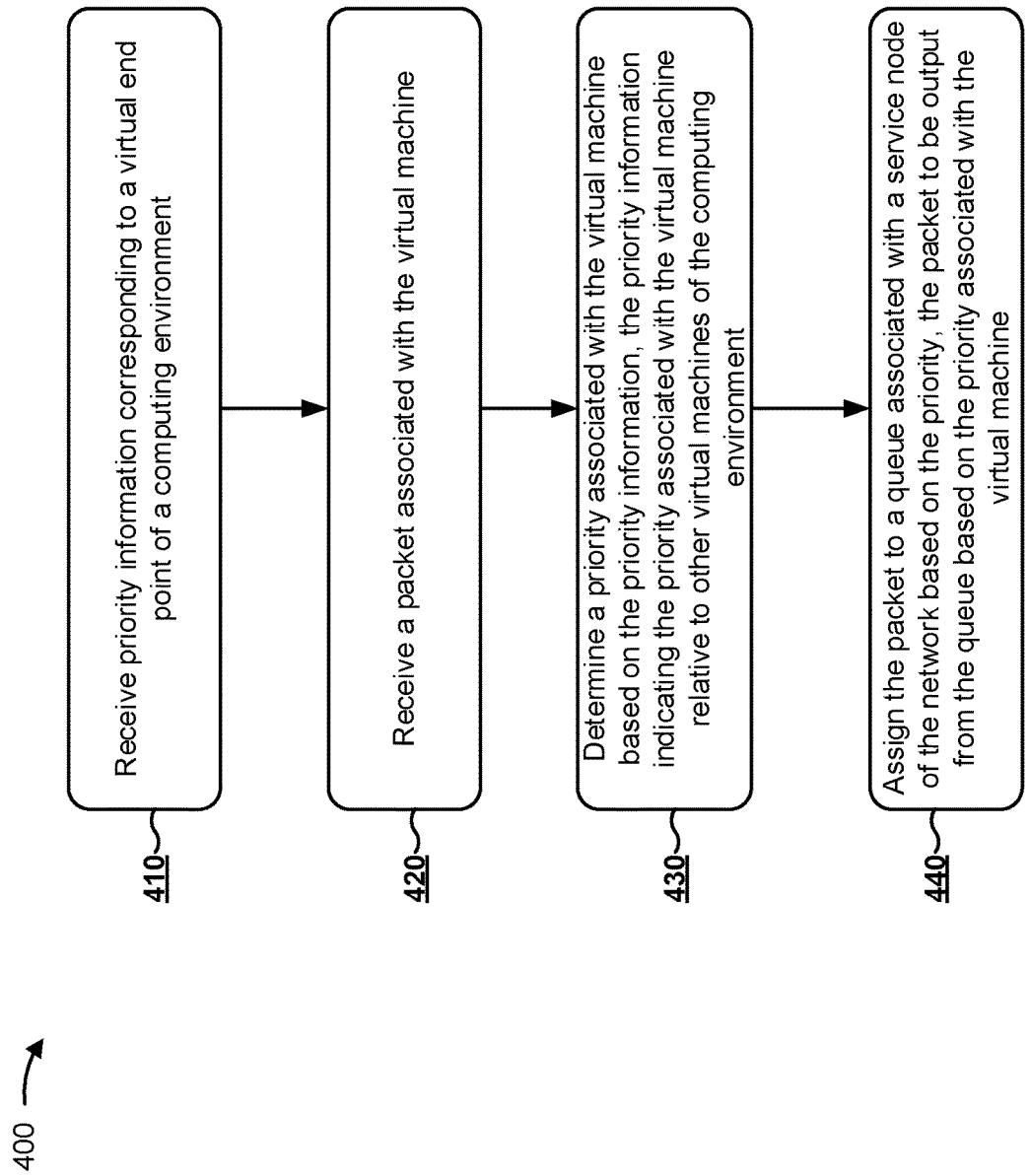
FIG. 4 is a flow chart of an example process for packet processing in a software defined data center based on priorities of virtual end points.

FIG. 4 is a flow chart of an example process 400 for packet processing in a software defined data center based on priorities of VEPs. In some implementations, one or more process blocks of FIG. 4 may be performed by SDDC subsystem 220. In some implementations, one or more process blocks of FIG. 4 may be performed by another device or a group of devices separate from or including SDDC subsystem 220, such as one or more VEPs 250, one or more interfaces associated with one or more VEPs 250, service node 260, queues 270, network 230, and/or cloud computing environment 210.

Although the examples to follow may refer to SDDC subsystem 220 performing process blocks of example process 400, service node 260 may also perform one or more or all of the process blocks of example process 400 of FIG. 4.

As shown in FIG. 4, process 400 may include receiving priority information corresponding to a virtual machine of a computing environment (block 410.) For example, SDDC subsystem 220 may receive priority information associated with VEP 250 of cloud computing environment 210. In some implementations, SDDC subsystem 220 may receive priority information for a plurality of virtual machines 225-2. Additionally, or alternatively, SDDC subsystem 220 may receive priority information corresponding to interfaces of VEP 250. Although examples to follow will generally describe priority associated with VEPs 250, in practice, priority may be associated with one or more interfaces of VEPs 250.

In some implementations, SDDC subsystem 220 may receive the priority information periodically, on a schedule, based on when a VEP 250 joins cloud computing environment 210, based on when an entity (e.g., a service provider that operates cloud computing environment 210, a customer of a service provider that operates cloud computing environment 210, or the like) associated with a VEP 250 changes a service plan, based on when a VEP 250 is activated or assigned to an entity, or the like. In some implementations, SDDC subsystem 220 may receive the priority information from SDDC orchestrator 222 (e.g., a controller and/or manager of cloud computing environment 210), from a software defined network (SDN) controller, or the like. In some implementations, SDDC orchestrator 222 may assign the priority to one or more VEPs 250 (e.g., based on a SLA associated with the VEPs 250, based on a type of data (e.g., audio, video, or the like) associated with services provided by the VEPs 250, based on a location (physical or logical) of the VEPs 250, based on a classification associated with data of the VEPs 250, etc.). Additionally, or alternatively, SDDC subsystem 220 may receive the priority information from one or more VEPs 250.

In some implementations, cloud computing environment 210 may store the priority information (e.g., in a data structure associated with cloud computing environment 210). In such a case, SDDC subsystem 220 may request, retrieve, and/or receive the priority information from the data structure associated with cloud computing environment 210. In some implementations, SDDC subsystem 220 may store received priority information in a local data structure (e.g., within VS 225-3). An example data structure (e.g., a database, table, index, task graph, linked list, etc.) representative of the priority information is shown below.

TABLE 1

| Identifier (ID) | Priority | Rx Queue | Tx Queue |
|---|---|---|---|
| VEP 250(1) | Medium | Queue 270-1 | Queue 270-2 |
| VEP 250(2) | High | Queue 270-3 | Queue 270-4 |
| VEP 250(3) | Low | Queue 270-5 | Queue 270-6 |
| . | . | . | . |
| . | . | . | . |
| . | . | . | . |
| VEP 250(Z) | Priority (X) | Queue 270-N | Queue 270-M |

As shown in the data structure, VEP 250(1), associated with Rx queue 270-1, and associated with Tx queue 270-2, is assigned a medium priority; VEP 250(2), associated with Rx queue 270-3, and associated with Tx queue 270-4, is assigned a high priority; and VEP 250(3), associated with Rx queue 270-5, and associated with Tx queue 270-6, is assigned a low priority. In some implementations, SDDC subsystem 220 may use the priority information to route packets associated with a VEP 250. Although in the examples to follow priority is described as high, medium, or low, any scale or levels of priority may be used (e.g., a priority scale of 1-10 (with 1 being low priority, 10 being high priority or vice versa), intermediate levels of priority between low, medium, and high (medium high, medium low, etc.), etc.).

In some implementations, SDDC subsystem 220 and/or SDDC orchestrator 222 may generate the priority information from a quality of service (QoS) level or generate the priority information to be representative of a QoS level (e.g., associated with a bandwidth, a scalability, a performance, or the like) that is to be provided to a VEP 250. In some implementations, the QoS level may be associated with a service plan (e.g., an SLA) of a user, a service plan of a business, or the like, associated with a VEP 250. Additionally, or alternatively, the QoS level may be associated with a type of data (e.g., messages, files, images, audio data, video data, streaming data, or the like). Accordingly, SDDC subsystem 220 and/or SDDC orchestrator 222 may assign the priority to one or more VEPs 250 based on an SLA associated with the VEPs 250, based on a type of data associated with the VEPs 250, based on a location (physical or logical) of the VEPs 250, based on a classification associated with data of the VEPs 250, or the like.

In this way, SDDC subsystem 220 and/or service node 260 may receive priority information associated with a particular VEP 250 that may be utilized when receiving packets associated with the particular VEP 250.

As further shown in FIG. 4, process 400 may include receiving a packet associated with a virtual machine of the plurality of virtual machines (block 420). For example, SDDC subsystem 220 may receive a packet associated with a VEP 250 or one or more interfaces of VEP 250. In some implementations, SDDC subsystem 220 and/or service node 260 may receive the packet based on a particular VEP 250 sending the packet to another VEP 250, or another VEP 250 sending the packet to SDDC subsystem 220. In some implementations, SDDC subsystem 220 may receive the packet periodically, based on a schedule, or based on a user or device authorizing the sending of the packet to/from VEP 250. In some implementations, SDDC subsystem 220 may receive the packet based on VEP 250 sending the packet to service node 260 and/or based on service node 260 sending the packet to VEP 250.

In some implementations, the packet may be associated with a particular interface of a particular VEP 250, or one or more interfaces associated with one or more VEPs 250, respectively (e.g., VEPs 250 may have multiple interfaces). Additionally, or alternatively, the packet may be associated with one or more queues 270 (or steering interfaces).

In some implementations, the queues 270 may map to VEPs 250 or interfaces associated with VEP 250 interfaces (e.g., one Rx queue 270 and one Tx queue 270 per VEP 250 (or one Rx queue 270 and one Tx queue 270 per VEP 250 interface)). For example, there may be a one-to-one mapping of VEPs 250 to queues 270 (where Y=Z in FIG. 2B).

In some implementations, a VEP 250 may transmit the packet to another VEP 250 of cloud computing environment 210. Additionally, or alternatively, a VEP 250 may receive the packet from another VEP 250 of cloud computing environment 210. In an example where the packet is an application packet, SDDC subsystem 220 may process and/or analyze the packet (e.g., so that service node 260 may perform a security analysis to analyze the packet for malware).

In this way, SDDC subsystem 220 and/or service node 260 may receive a packet to permit SDDC subsystem 220 and/or service node 260 to determine a priority associated with a VEP associated with the packet.

As further shown in FIG. 4, process 400 may include determining a priority associated with the virtual machine based on the priority information, the priority information indicating a priority associated with the virtual machine relative to other virtual machines of the computing environment (block 430). For example, SDDC subsystem 220 may determine the priority associated with VEP 250 based on the priority information indicating a priority associated with VEP 250. In some implementations, SDDC subsystem 220 may determine the priority associated with VEP 250 based on receiving the packet associated with VEP 250.

In some implementations, the priority associated with VEP 250 may be a level (e.g., high, medium, low, or the like), a score (e.g., a numerical score), or the like. In some implementations, the priority associated with VEP 250 may correspond to a rate at which service node 260 is to obtain packets from a queue 270 associated with VEP 250 to be processed and/or transferred to/from VEP 250. In some implementations, the priority may correspond to a rate at which SDDC subsystem 220 is to obtain packets (e.g., packets serviced by service node 260) from a queue 270 and sent to a destination VEP by SDDC subsystem 220.

In some implementations, the priority information may include an identifier (ID) of a particular VEP 250 associated with a packet (e.g., see Table 1). In this case, SDDC subsystem 220 may cross check the ID of the particular VEP 250 with the priority information to determine the priority associated with VEP 250 (e.g., by referencing a data structure similar to Table 1). The priority information indicates a priority of VEP 250 relative to other VEPs 250 of cloud computing environment 210 in that the priority information may show the VEP 250 is to be given a higher priority, a same priority, or a lower priority than the other VEPs 250 of the cloud computing environment 210.

In some implementations, SDDC subsystem 220 may track the number of queues 270 corresponding to particular priorities associated with VEPs 250 and/or a particular VEP 250 of computing resource 225. Accordingly, SDDC subsystem 220 may determine a number of VEPs associated with high, medium, low priority. As such, SDDC subsystem 220 (and/or SDDC orchestrator 222) may use the distribution of priorities to balance loads of service nodes (e.g., similar to service node 260) or of computing resources 225 handling traffic from the VEPs 250. For example, if a computing resource 225 becomes overloaded and a particular VEP 250 is associated with multiple high priority traffic flows (and thus, corresponding high priority queues), the VEP 250 (and/or one or more other VEPs 250) may be transferred to a different computing resource 225 that has more available capacity to handle the traffic, ensuring that the high priority VEP receives the appropriate level of service.

In this way, SDDC subsystem 220 may determine a priority associated with the particular VEP 250 to enable SDDC subsystem 220 to assign the packet to a queue 270 corresponding to the priority associated with the particular VEP 250.

As further shown in FIG. 4, process 400 may include assigning the packet to a queue associated with a service node based on the priority, the packet to be output from the queue based on the priority associated with the virtual machine (block 440). For example, SDDC subsystem 220 and/or service node 260 may assign the packet to queue 270 associated with service node 260 based on the priority, and SDDC subsystem 220 (in Tx direction) and/or service node 260 (in Rx direction) may obtain the packet from the queue 270 associated with service node 260 based on the priority associated with VEP 250.

In some implementations, SDDC subsystem 220 may route traffic to service node 260 (in an Rx direction), and service node 260 may obtain packets from queues 270 (in the Rx direction). Additionally, or alternatively, service node 260 may route traffic to SDDC subsystem 220 (in a Tx direction), and SDDC subsystem 220 may obtain packets from queues 270 (in the Tx direction). In some implementations, a queue 270 may be a receive queue 270 (going toward service node 260) or a transmit queue 270 (coming from service node 260). In some implementations, queues 270 may be maintained or hosted by SDDC subsystem 220.

In some implementations, SDDC subsystem 220 or service node 260 may assign the packet to queue 270 based on SDDC subsystem 220 or service node 260 receiving the packet and/or based on the priority associated with VEP 250. Additionally, or alternatively, service node 260 may assign a packet to a queue 270 associated with SDDC subsystem 220 based on the priority of the packet. SDDC subsystem 220 and/or service node 260 may obtain the packet from queue 270 based on the priority associated with VEP 250.

In some implementations, service node 260 may include one or more intrusion prevention systems, one or more application firewalls, or the like. In some implementations, service node 260 may be service node 260 of a microsegmentation environment.

In some implementations, SDDC subsystem 220 may receive packets from queues 270 using a particular schedule based on the priority. Additionally, or alternatively, service node 260 may receive packets from queues 270 using a particular schedule based on the priority. For example, service node 260 may receive packets from Rx queues 270, and SDDC subsystem 220 may receive packets from Tx queues 270. In some implementations, (e.g., for multiple queues 270) service node 260 may use a WRR scheduling to obtain the packets from an Rx queue 270. In some implementations, different weights may be applied to queues 270 based on the priority of the packet.

In some implementations, SDDC subsystem 220 may obtain a quantity of packets from queues 270 each round based on weights assigned to the queues 270. For example, during one round of WRR processing, service node 260 may obtain one packet of data from a low priority Rx queue 270, four packets of data from a high priority Rx queue 270, and two packets of data from a medium priority Rx queue 270. As another example, during one round of WRR processing, SDDC subsystem 220 may obtain one packet of data from a low priority Tx queue 270, four packets of data from a high priority Tx queue 270, and two packets of data from a medium priority Tx queue 270. Although, an example of the priority of the packets, queues 270, VEPs 250 is described as low, medium, and/or high, in some implementations, there may be any number of different priorities. Additionally, or alternatively, although a particular priority may correspond to packets being obtained from an Rx queue at one rate, the same priority may not correspond to the packets being obtained from a Tx queue at the same rate. For example, for service node 260 may obtain packets associated with a high priority VEP from an Rx queue at four packets per round, while SDDC subsystem 220 may obtain the packets associated with the high priority from a Tx queue at 8 packets per round (e.g., after service node 260 processes the packets).

According to some implementations herein, service node 260 may serve as a bump in the wire in that the service node will enable packets to pass from one VEP 250 to another VEP 250 without modifying or changing the packet. For example, service node 260 may allow packets to pass when the service node does not detect a presence of malware, but may block packets when service node 260 detects the presence of malware in the packet. In such implementations, when service node 260 acts as a bump in the wire, service node 260 (in the Rx direction) may obtain packets from queues 270 at a same rate according to a WRR scheduler as the SDDC subsystem 220 (in the Tx direction) obtains the packets from the queues 270 to send onto a destination VEP 250. In some implementations, when service node 260 analyzes or processes packets that may modify or change the information of the packets, service node 260 (in the Rx direction) may obtain packets from queues 270 at a different rate according to a WRR scheduler than the SDDC subsystem 220 (in the Tx direction) obtains the packets from the queues 270 to send onto a destination VEP 250 to account for the changed state of the packet. Accordingly, in some implementations, priority for a particular packet and/or VEP 250 may change due to processing by service node 260.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
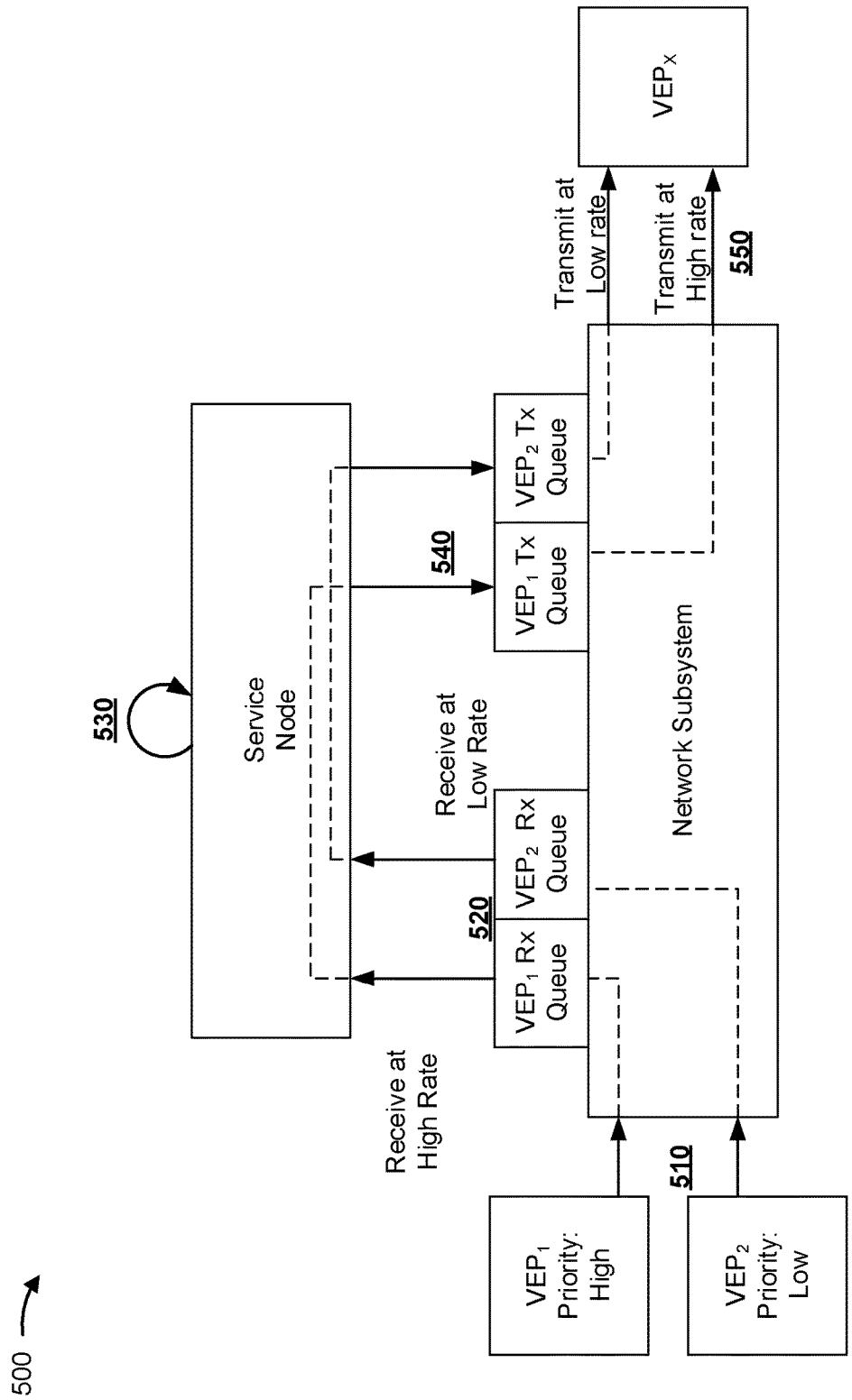
FIG. 5 is a diagram of an example implementation relating to the example process shown in FIG. 4.

FIG. 5 is a diagram of an example implementation 500 relating to example process 400 shown in FIG. 4. FIG. 5 show an example of providing class-based treatment (shown as high priority and low priority) to packets received from or sent to VEPs.

As shown in FIG. 5, example implementation 500 may include a source $VEP_1$, which is assigned a high priority (e.g., $VEP_1$ Priority: High), a source $VEP_2$, which is assigned a low priority (e.g., $VEP_2$ Priority: Low), and a destination $VEP_X$ (which is not shown to be assigned a priority, but may be assigned a priority in some implementations). Example implementation 500 also may include a $VEP_1$ Tx queue, a $VEP_2$ Tx queue, a $VEP_1$ Rx queue, and a $VEP_2$ Rx queue. Example implementation 500 also may include an SDDC subsystem and a service node. As shown, example implementation 500 describes a flow of a packet from a particular source VEP, through the SDDC subsystem, to the service node, back to the subsystem, and then to a particular destination VEP.

As shown by reference number 510, $VEP_1$ Priority: High provides one or more packets to the SDDC subsystem. Also as shown by reference number 510, $VEP_2$ Priority: Low provides one or more packets to the SDDC subsystem. The SDDC subsystem may route the packets from $VEP_1$ Priority: High to the $VEP_1$ Rx queue. The SDDC subsystem may route the packets from $VEP_2$ Priority: Low to the $VEP_2$ Tx queue.

As shown by reference number 520, the service node may obtain the packets from the $VEP_1$ transmit queue, and may receive the packets from the $VEP_1$ transmit queue at a high rate (e.g., at a high rate of a WRR scheduler). Also as shown by reference number 520, the service node may obtain the packets from the $VEP_2$ transmit queues, and may receive the packets from the $VEP_2$ transmit queue at a low rate (e.g., at a low rate of a WRR scheduler).

As shown by reference number 530, the service node may process the packets from the Rx queues. In some implementations, the service node may allow or disallow packets to pass based on the contents of the packet and information in the packet header (e.g., act as a bump in the wire).

As shown by reference number 540, the service node may route the packets received from the $VEP_1$ Rx queue to the $VEP_1$ Tx queue. Also as shown by reference number 530, the service node may route the packets received from the $VEP_2$ Rx queue to the $VEP_2$ Tx queue.

As shown by reference number 550, the SDDC subsystem may obtain the packets from the $VEP_1$ transmit queue and from the $VEP_2$ transmit queue, based on priority, and may route the packets to a destination VEP. For example the SDDC subsystem may transmit the packets received from the $VEP_1$ transmit queue to $VEP_X$ at a high rate (e.g., at a high rate of a WRR scheduler) and the SDDC subsystem may transmit the packets received from the $VEP_2$ transmit queue to $VEP_X$ at a low rate (e.g., at a low rate of a WRR scheduler).

As indicated above, FIG. 5 is provided merely as an example. Other examples are possible and may differ from what was described with regard to FIG. 5.

FIG. 6 is a flow chart of an example process 600 for assigning priority to VEPs. In some implementations, one or more process blocks of FIG. 6 may be performed by SDDC orchestrator 222. In some implementations, SDDC orchestrator may perform one or more of the process blocks of the example process 600 prior to SDDC subsystem 220 performing one or more process blocks of example process 400.

As shown in FIG. 6, process 600 may include obtaining characteristics of VEPs (block 610). For example, SDDC orchestrator 222 may obtain the characteristics of the VEPs. In some implementations, SDDC orchestrator 222 may obtain the characteristics of the VEPs when the VEPs are set up, activated, connected to, and/or are established to communicate with cloud computing environment 210.

According to some implementations, characteristics of the VEPs may include one or more SLAs (e.g., that indicates respective service levels and/or priorities that are to be assigned to the VEPs), one or more data types (e.g., video data, message data, image data, streaming data, batch data, status data, communication data, and/or the like) transmitted/received via the VEP, a state of the VEP (e.g., active/inactive, connected/disconnected, and/or the like), capabilities of the VEP (e.g., processing capabilities, reliability, and/or the like), location information of the VEP (indicating a location of the VEP), machine learning information associated with the VEPs (e.g., information corresponding to previous data communications to/from the VEPs), and/or the like.

In some implementations, SDDC orchestrator 222 may obtain the characteristics by storing the characteristics in a data structure (e.g., a database, a table, an index, and/or the like). In some implementations, the SDDC orchestrator 222 may collect the characteristics from VEPs within or in communication with cloud computing environment 210. In some implementations, SDDC orchestrator 222 may receive the characteristics from the VEPs via a communication, a message, and/or the like (e.g., upon establishing a communication link with the SDDC orchestrator 222).

In this way, SDDC orchestrator 222 may obtain characteristics of VEPs that may be used to assign a priority to the VEPs.

As further shown in FIG. 6, process 600 may include assigning priorities to the VEPs based on the characteristics (block 620). For example SDDC orchestrator 222 may assign the priorities to the VEPs. In some implementations, SDDC orchestrator 222 may assign the priorities to the VEPs based on obtaining the characteristics of the VEPs, based on detecting traffic to/from the VEPs, and/or the like.

According to some implementations, SDDC orchestrator 222 assigns a priority to a VEP to indicate when and/or how information or data of the VEP is to be processed by SDDC subsystem 220 and/or service node 260. For example, SDDC orchestrator 222 may assign a high priority to a VEP that transmits or received data that is to be processed at a faster rate than another VEP that is assigned a low priority.

Using the characteristics of the VEPs, network orchestrator 222 assigns corresponding priorities to the VEPS. In some implementations, network orchestrator 222 may assign various priorities to VEPs according to a scoring and/or weighting system based on characteristics of the VEPs. For example, network orchestrator 222 may weight one or more certain characteristic more heavily than others and score the one or more characteristics according to values, measures, or information associated with the one or more characteristics. In some implementations, network orchestrator 222 may weight and/or score characteristics based on settings of the system and/or user input.

In this way, SDDC orchestrator 222 may assign the priorities to the VEPs such that SDDC subsystem 220 and/or service node 260 may use the priorities to process traffic.

As further shown in FIG. 6, process 600 may include providing priority information corresponding to the priorities of the VEPs to an SDDC subsystem (block 630). For example SDDC orchestrator 222 may provide the priority information corresponding to the priorities of the VEPs to SDDC subsystem 220 and/or service node 260.

According to some implementations herein, the priority information may include the priority of the VEPs and/or VEP information (e.g., an identifier, characteristics, and/or the like). In some implementations, SDDC subsystem 220 and/or service node 260 may obtain the priority information from network orchestrator 222. For example, network orchestrator 222 may provide the priority information by storing and/or making the priority information available to SDDC subsystem 220 and/or service node 260 such that SDDC subsystem 220 and/or service node 260 may retrieve the priority information from the network orchestrator 222 (e.g., from a data structure of network orchestrator 222).

In this way, network orchestrator 222 may provide priority information to SDDC subsystem 220 and/or service node 260 to facilitate processing packets based on priorities of VEPs associated with the packets.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the SDDC subsystem and/or the service node may provide class-based treatment to VEPs of an SDDC and/or a cloud computing environment. Also, in this way the SDDC subsystem and/or the service node may provide fine-tuned service processing for particular groups or sets of VEPs (or interfaces associated with VEPs). Further, in implementations in which the SDDC subsystem and/or the service node monitor priority of traffic to determine when VEPs are to be transferred to other computing resources (e.g. servers), if a threshold amount of high priority traffic is being received from a particular VEP of a computing resource and/or the computing resource is nearing bandwidth limits, the SDDC subsystem and/or the service node may transfer the VEP to another computing resource. In this way, the SDDC subsystem and/or the service node may monitor, track, and distribute VEPs and/or computing resources to enable visibility to a user, and/or ensure efficient performance of the computing resources, prevent overloading a network or a computing resource, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors to:
        receive priority information corresponding to a virtual machine interface of a virtual machine of a computing environment;
        receive a packet associated with the virtual machine interface;
        determine a priority associated with the virtual machine interface based on the priority information,
            the priority information indicating the priority associated with virtual machine interface relative to other virtual machine interfaces of the computing environment;
        assign the packet to a queue associated with a service node of the computing environment based on the virtual machine interface,
            the packet to be output from the queue at a rate based on the priority associated with the virtual machine interface;
        receive the packet from the service node after the packet is processed by the service node;
        assign the packet to a transmit queue corresponding to the virtual machine interface; and
        send the packet from the transmit queue toward a destination virtual machine interface at a rate based on the priority associated with the virtual machine interface.

2. The device of claim 1, where the packet is to be output from the queue based on the priority according to a weighted round robin scheduler.

3. The device of claim 1, where the priority information corresponds to the virtual machine interface of the virtual machine of the computing environment and the priority information indicates a priority associated with the virtual machine interface.

4. The device of claim 1, where the queue comprises a receive queue of the service node, the receive queue being managed by an SDDC subsystem of the computing environment.

5. The device of claim 1, where the queue comprises a transmit queue of the service node, the transmit queue being managed by an SDDC subsystem of the computing environment.

6. The device of claim 1, where the packet is associated with the virtual machine interface based on the virtual machine interface being a source of the packet or the virtual machine interface being a destination of the packet.

7. The device of claim 1, where the device comprises an SDDC subsystem of the computing environment.

8. The device of claim 1, where the service node provides at least one of a network service or a storage service.

9. A non-transitory computer-readable medium storing instructions, the instructions comprising:
    one or more instructions that, when executed by one or more processors, cause the one or more processors to:
        receive priority information corresponding to a virtual machine interface of a virtual machine of a computing environment;
        receive a packet associated with the virtual machine interface;
        determine a priority associated with the virtual machine interface based on the priority information,
            the priority information indicating the priority associated with the virtual machine interface relative to other virtual machine interfaces of the computing environment;
        assign the packet to a queue to be processed by a service node of the computing environment based on the virtual machine interface,
            the packet to be output from the queue at a rate based on the priority associated with the virtual machine interface;
        receive the packet from the service node after the packet is processed by the service node;
        assign the packet to a transmit queue corresponding to the virtual machine interface; and send the packet from the transmit queue toward a destination virtual machine interface at a rate based on the priority associated with the virtual machine interface.

10. The non-transitory computer-readable medium of claim 9, where the service node provides a network service or a storage service.

11. The non-transitory computer-readable medium of claim 9, where the packet is to be output from the queue according to a weighted round robin scheduler.

12. The non-transitory computer-readable medium of claim 9, where the priority is based on a type of data indicated in the priority information.

13. The non-transitory computer-readable medium of claim 9, where the priority is based on a service level agreement corresponding to the priority information.

14. The non-transitory computer-readable medium of claim 9, where the one or more instructions that, when sending the packet, cause the one or more processors to:
   transmit the packet from a transmit queue of an SDDC subsystem to a virtual machine endpoint.

15. A method, comprising:
   receiving priority information corresponding to a virtual machine interface of a virtual machine of a cloud computing environment;
   determining a priority associated with the virtual machine interface based on the priority information,
      the priority information indicating the priority associated with the virtual machine interface relative to other virtual machine interfaces of the cloud computing environment;
   receiving a packet from a queue at a rate based on the priority associated with the virtual machine interface;
   processing the packet from the queue based on the priority associated with the virtual machine interface; and
   routing the packet to a transmit queue corresponding to the virtual machine interface,
      the packet to be sent from the transmit queue toward a destination virtual machine interface at a rate based on the priority associated with the virtual machine interface.

16. The method of claim 15, where processing the packet from the queue further comprises:
   performing a security analysis on the packet; and
   blocking the packet if the security analysis indicates a presence of malware, or
   assigning the packet to a transmit queue of an SDDC subsystem if the security analysis indicates that packet does not include malware.

17. The method of claim 15, where receiving the packet from the queue further comprises:
   obtaining the packet from the queue according to a weighted round robin scheduler.

18. The method of claim 15, where the queue is assigned to the virtual machine by an SDDC subsystem of the cloud computing environment.

19. The method of claim 15, where the priority is based on a service level agreement corresponding to the priority information.

20. The method of claim 15, where processing the packet from the queue further comprises:
   processing the packet by performing one or more of:
      packet inspection,
      packet counting, or
      packet look-up.

* * * * *